(12) United States Patent
Chen et al.

(10) Patent No.: US 12,021,300 B2
(45) Date of Patent: Jun. 25, 2024

(54) MOBILE TERMINAL

(71) Applicant: HuiZhou TCL Mobile Communication Co., Ltd., Guangdong (CN)

(72) Inventors: Wei Chen, Guangdong (CN); Zhiwei Chen, Guangdong (CN); Pan Zhang, Guangdong (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 248 days.

(21) Appl. No.: 17/617,584

(22) PCT Filed: Dec. 19, 2019

(86) PCT No.: PCT/CN2019/126478
§ 371 (c)(1),
(2) Date: Dec. 9, 2021

(87) PCT Pub. No.: WO2021/114343
PCT Pub. Date: Jun. 17, 2021

(65) Prior Publication Data
US 2022/0247068 A1  Aug. 4, 2022

(30) Foreign Application Priority Data
Dec. 12, 2019 (CN) .......................... 201911271023.5

(51) Int. Cl.
*H01Q 1/24* (2006.01)
*H01Q 1/38* (2006.01)
(Continued)

(52) U.S. Cl.
CPC ............... *H01Q 1/38* (2013.01); *H01Q 1/243* (2013.01); *H01Q 1/48* (2013.01); *H01Q 1/50* (2013.01);
(Continued)

(58) Field of Classification Search
CPC ............ H01Q 1/24; H01Q 1/243; H01Q 1/38; H01Q 1/48; H01Q 1/50; H01Q 5/33;
(Continued)

(56) References Cited

U.S. PATENT DOCUMENTS 6,943,738 B1  9/2005  Mattsson et al.
7,482,984 B2 *  1/2009  Rosengren ............. H01Q 7/005
343/702
(Continued)

FOREIGN PATENT DOCUMENTS

CN  201084819  7/2008
CN  201134507  10/2008
(Continued)

OTHER PUBLICATIONS

International Search Report and the Written Opinion dated Aug. 27, 2020 From the International Searching Authority Re. Application No. PCT/CN2019/126478 and Its Translation of Search Report Into English. (8 Pages).

(Continued)

*Primary Examiner* — Tho G Phan

(57) ABSTRACT

Disclosed is a mobile terminal. The mobile terminal comprises a body, an insulating bezel surrounding the periphery of the body, and a wire that is located in the insulating bezel and that acts as an antenna. The wire comprises a first line segment and at least two bending line segments that are connected to the first line segment. The bending line segments bend and extend into convex shapes from the connecting position of the first line segment, at least one bending line segment acts as the ground point of the antenna, and at least one bending line segment acts as the feed point of the antenna.

18 Claims, 3 Drawing Sheets

(51) Int. Cl.
  *H01Q 1/48*    (2006.01)
  *H01Q 1/50*    (2006.01)
  *H01Q 5/335*   (2015.01)
  *H01Q 5/50*    (2015.01)
  *H04M 1/02*    (2006.01)

(52) U.S. Cl.
  CPC .............. *H01Q 5/335* (2015.01); *H01Q 5/50* (2015.01); *H04M 1/0277* (2013.01); *H04M 2201/06* (2013.01)

(58) Field of Classification Search
  CPC ............ H01Q 5/335; H01Q 5/50; H01Q 1/22; H01Q 1/2258; H01Q 1/36; H01Q 1/40; H01Q 5/20; H01Q 5/28; H01Q 5/30; H01Q 5/307; H01Q 5/371; H01Q 9/42; H04M 1/0277; H04M 2201/06
  See application file for complete search history.

(56) References Cited

U.S. PATENT DOCUMENTS

| | | | |
|---|---|---|---|
| 8,542,154 B2* | 9/2013 | You | H01Q 1/243 |
| | | | 343/702 |
| 9,035,847 B2 | 5/2015 | Black et al. | |
| 9,730,370 B2 | 8/2017 | Tsao | |
| 10,290,924 B2* | 5/2019 | Chou | H01Q 19/26 |
| 10,396,433 B2* | 8/2019 | Wu | H01Q 1/2291 |
| 10,727,596 B2* | 7/2020 | Quinlan | H01Q 9/0421 |
| 11,108,132 B2* | 8/2021 | Dong | H01Q 1/48 |
| 11,205,833 B2* | 12/2021 | Wang | H01Q 5/314 |
| 11,276,930 B2* | 3/2022 | Zhou | H01Q 1/48 |
| 2013/0076573 A1 | 3/2013 | Rappoport et al. | |
| 2016/0029492 A1 | 1/2016 | Hikino et al. | |
| 2018/0026355 A1 | 1/2018 | Lee et al. | |

FOREIGN PATENT DOCUMENTS

| | | |
|---|---|---|
| CN | 102170040 | 8/2011 |
| CN | 105635358 | 6/2016 |
| CN | 105792560 | 7/2016 |
| CN | 105914450 | 8/2016 |
| CN | 106384868 | 2/2017 |
| CN | 106654525 | 5/2017 |
| CN | 106898860 | 6/2017 |
| CN | 207530100 | 6/2018 |
| CN | 108288759 | 7/2018 |
| CN | 108615968 | 10/2018 |
| JP | 2017-158002 | 9/2017 |

OTHER PUBLICATIONS

Notification of Office Action and Search Report dated Aug. 4, 2020 From the State Intellectual Property Office of the People's Republic of China Re. Application No. 201911271023.5 and Its Translation of Office Action Into English. (14 Pages).

Notice of Allowance dated May 7, 2021 From the State Intellectual Property Office of the People's Republic of China Re. Application No. 201911271023.5 and Its Translation of Office Action Into English. (9 Pages).

Supplementary European Search Report and the European Search Opinion Dated Jan. 18, 2024 From the European Patent Office Re. Application No. 19955587.1. (10 Pages).

* cited by examiner

MOBILE TERMINAL

RELATED APPLICATIONS

This application is a National Phase of PCT Patent Application No. PCT/CN2019/126478 having International filing date of Dec. 19, 2019, which claims the benefit of priority of Chinese Patent Application No. 201911271023.5 filed on Dec. 12, 2019. The contents of the above applications are all incorporated by reference as if fully set forth herein in their entirety.

FIELD AND BACKGROUND OF THE INVENTION

The present invention relates to an electronic equipment, and more particularly, to a mobile terminal.

A mobile terminal is an important wireless communication equipment. The antenna of the mobile terminal is a necessary element for the mobile terminal to achieve the wireless communication. The antenna is used to transmit/receive signals for communication and is an important factor for determining communication qualities.

Conventionally, the mobile terminal has a plastic frame and utilizes a flexible printed circuit (FPC) to implement the antenna. Here, the FPC antenna is often placed on the inner support or an inner side of the battery cover. However, because the distance between the FPC antenna and inner metal components is not long enough, it might affect the antenna performance of the mobile terminal.

SUMMARY OF THE INVENTION

One objective of an embodiment of the present invention is to provide a mobile terminal, to raise the antenna performance of the mobile terminal.

According to an embodiment of the present invention, a mobile terminal is disclosed. The mobile terminal comprises a main body, an insulating side frame surrounding the main body, and a conductive line that is placed in the insulating side frame, configured to work as an antenna. The conductive line comprises a first segment and at least two bended segments that are connected to and extend from the first segment and are protruded such that a part of the bended segments is outside the insulating side frame. One of the bended segments is configured as a ground and another of the bended segments is configured as a feed point of the antenna. The first segment comprises a first sub-segment and a second sub-segment, wherein one end of the bended segments is connected to the first sub-segment and another end of the bended segments is connected to the second sub-segment, and the first sub-segment and the second sub-segment have different lengths.

Optionally, the main body comprises a circuit board and at least two connecting spring sheets. One of the connecting spring sheets has an end connected to the circuit board and another end electrically connected to the bended segment configured as the ground, and one of the connecting spring sheets has an end connected to the circuit board and another end electrically connected to the bended segment configured as the feed point of the antenna.

Optionally, the connecting spring sheet has a contact area with the bended segments, and a shape of the contact area matches a shape of the bended segments.

Optionally, the shape of the contact area is cylinder.

Optionally, the circuit board has an antenna matching circuit, electrically connected to the feed point of the antenna through the connecting spring sheet.

Optionally, a number of the conductive lines is not less than 2, and the conductive lines surrounds the main body in an interval.

Optionally, the bended segments comprise a first straight line segment, a second straight line segment and a third straight line segment, the first straight line segment is parallel to the third straight line segment, and the second straight line segment is vertical to the third straight line segment.

Optionally, a thickness of the insulating side frame is between 1-1.5 mm and a diameter of the conductive line is between 0.8-1 mm.

Optionally, a material of the conductive line is copper, iron, aluminum, or stainless steel.

Optionally, the first sub-segment is placed in two side frames adjacent to the insulating side frame and is curved or bended at an intersection of the two side frames.

According to another embodiment of the present invention, a mobile terminal is disclosed. The mobile terminal includes a main body, an insulating side frame surrounding the main body, and a conductive line, placed in the insulating side frame, configured to work as an antenna. The conductive line includes a first segment and at least two bended segments, connected to and extend from the first segment and are protruded. One of the bended segments is configured as a ground and another of the bended segments is configured as a feed point of the antenna.

Optionally, a part of the bended segments is outside the insulating side frame

Optionally, the main body comprises a circuit board and at least two connecting spring sheets. One of the connecting spring sheets has an end connected to the circuit board and another end electrically connected to the bended segment configured as the ground. One of the connecting spring sheets has an end connected to the circuit board and another end electrically connected to the bended segment configured as the feed point of the antenna.

Optionally, the connecting spring sheet has a contact area with the bended segments, and a shape of the contact area matches a shape of the bended segments.

Optionally, the circuit board has an antenna matching circuit, electrically connected to the feed point of the antenna through the connecting spring sheet.

Optionally, a number of the conductive lines is not less than 2, and the conductive lines surrounds the main body in an interval.

Optionally, the first segment comprises a first sub-segment and a second sub-segment, wherein one end of the bended segments is connected to the first sub-segment and another end of the bended segments is connected to the second sub-segment, and the first sub-segment and the second sub-segment have different lengths.

Optionally, the bended segments comprise a first straight line segment, a second straight line segment and a third straight line segment, the first straight line segment is parallel to the third straight line segment, and the second straight line segment is vertical to the third straight line segment.

Optionally, a thickness of the insulating side frame is between 1-1.5 mm and a diameter of the conductive line is between 0.8-1 mm.

Optionally, a material of the conductive line is copper, iron, aluminum, or stainless steel.

In contrast to the conventional art, the mobile terminal comprises a main body, an insulating side frame surrounding the main body, and a conductive line that is placed in the insulating side frame, configured to work as an antenna. The conductive line comprises a first segment and at least two bended segments, wherein the two bended segments connected to and extend from the first segment and are protruded. One of the bended segments is configured as a ground and another of the bended segments is configured as a feed point of the antenna. Accordingly, the antenna is placed in the insulating side frame of the mobile terminal such that the antenna could be away from the inner metal components of the mobile terminal. In this way, the performance of the antenna could be improved.

BRIEF DESCRIPTION OF THE SEVERAL VIEWS OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF SPECIFIC EMBODIMENTS OF THE INVENTION

Figure 1:
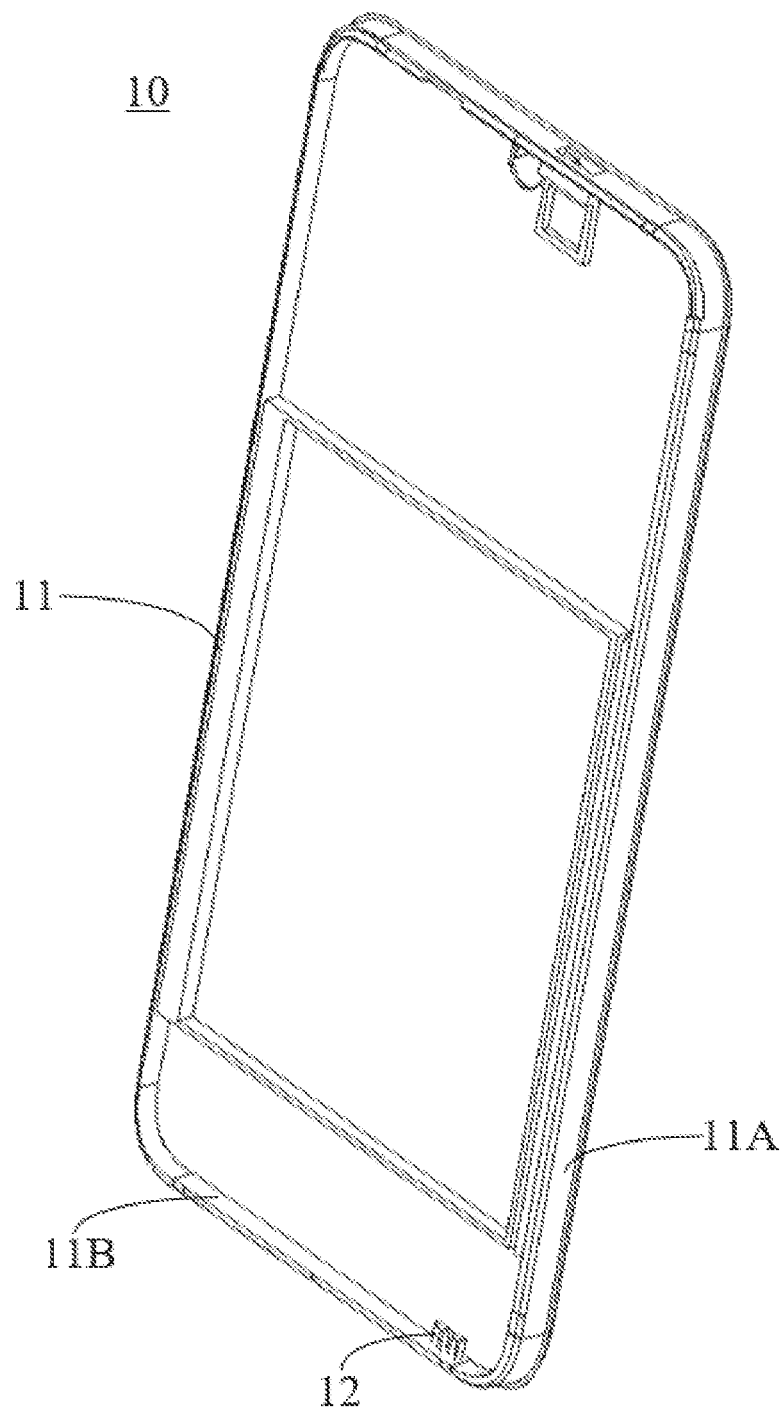
FIG. 1 is a diagram showing a 3-dimensional structure of a mobile terminal according to an embodiment of the present invention.

Embodiments of the present application are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present application, and are not to be construed as limiting the scope of the present application.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

A conventional mobile terminal may have a plastic frame and an FPC, where the FPC is used as antenna. The FPC antenna is often placed on the inner support or an inner side of the battery cover of the mobile terminal. However, because the distance between the FPC antenna and inner metal components is not long enough, it might affect the antenna performance of the mobile terminal. In order to solve this issue, a mobile terminal is disclosed to raise the antenna performance of the mobile terminal.

Figure 2:
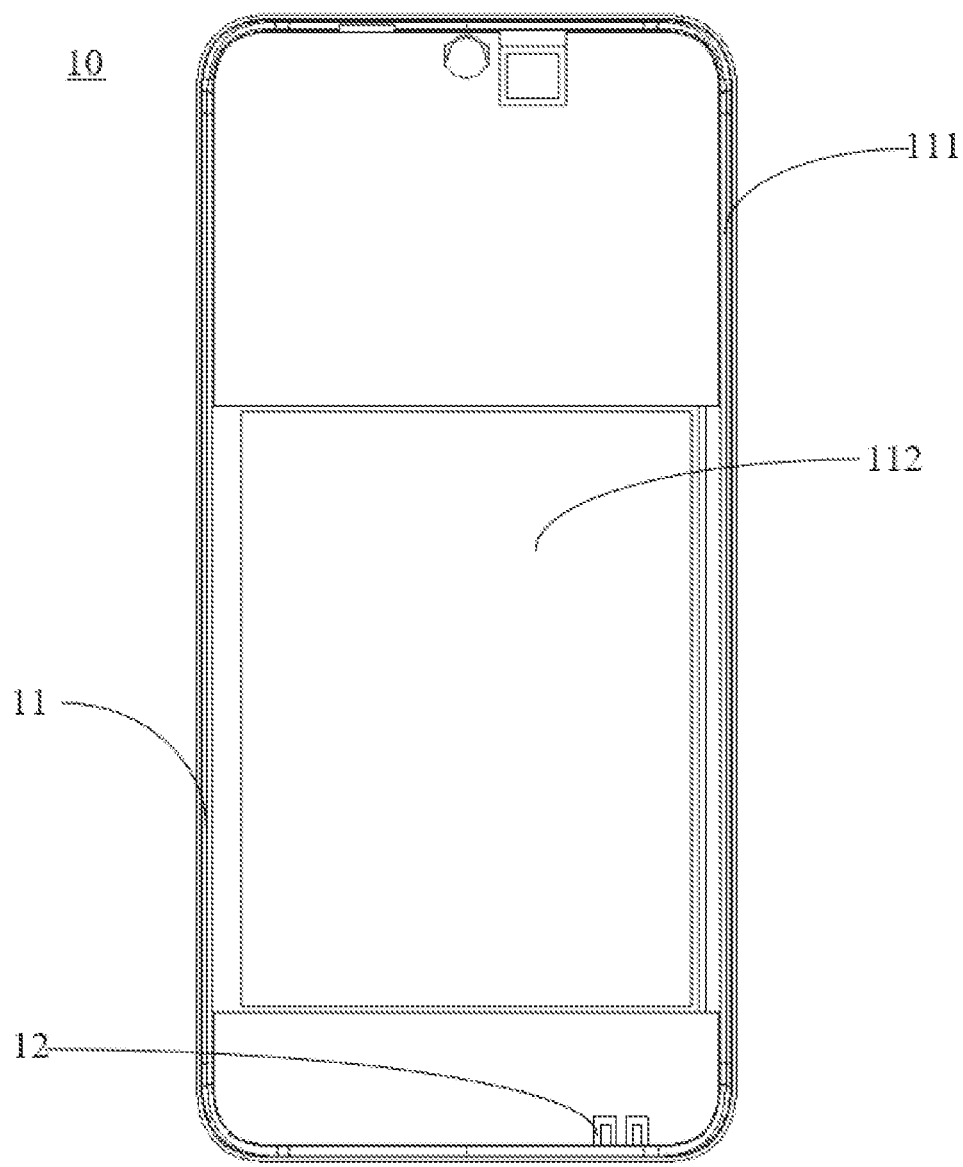
FIG. 2 is a diagram showing a top view of a mobile terminal according to an embodiment of the present invention.
Figure 3:
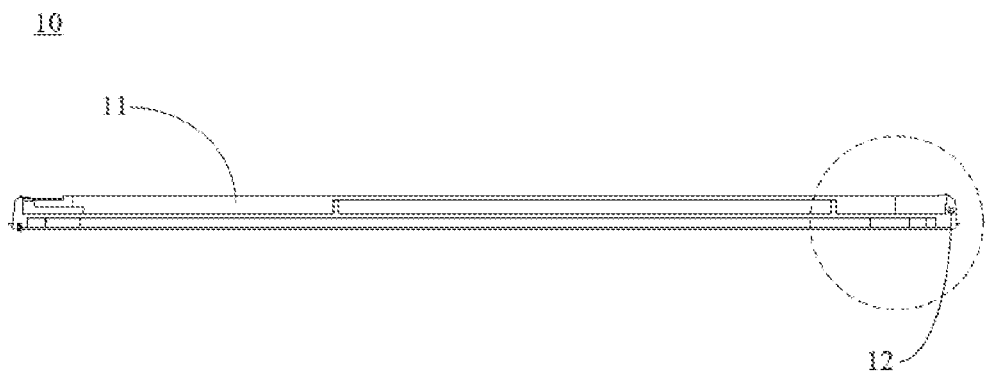
FIG. 3 is a diagram showing a cross-section of the mobile terminal shown in FIG. 2.
Figure 4:
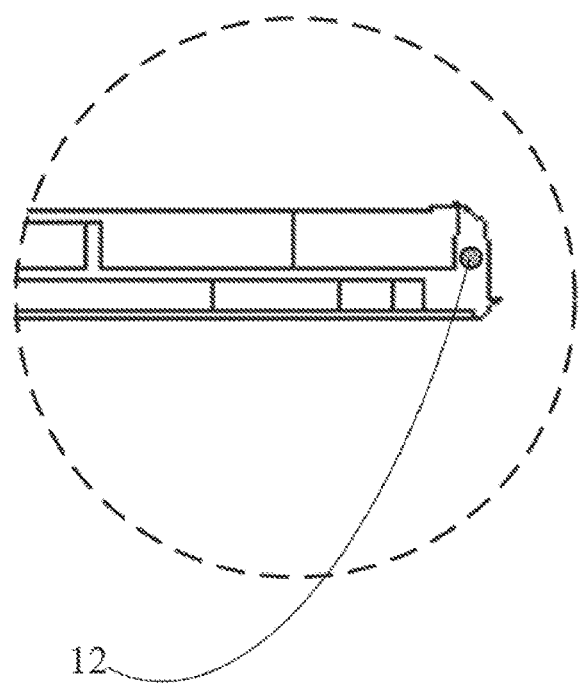
FIG. 4 is a scale up diagram of a part of the mobile terminal shown in FIG. 3.
Figure 5:
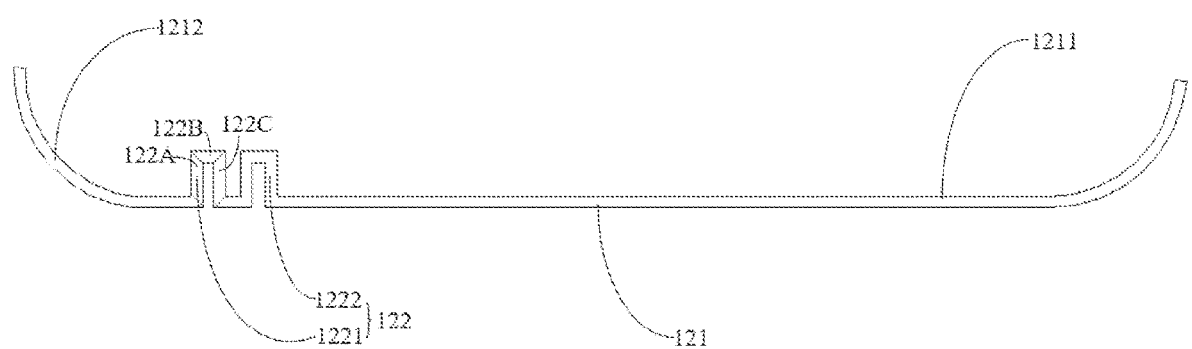
FIG. 5 is a diagram of a conductive line shown in FIG. 2.

Please refer to FIG. 1-FIG. 5. FIG. 1 is a diagram showing a 3-dimensional structure of a mobile terminal according to an embodiment of the present invention. FIG. 2 is a diagram showing a top view of a mobile terminal according to an embodiment of the present invention. FIG. 3 is a diagram showing a cross-section of the mobile terminal shown in FIG. 2. FIG. 4 is a scale up diagram of a part of the mobile terminal shown in FIG. 3. FIG. 5 is a diagram of a conductive line shown in FIG. 2. The mobile terminal 10 comprises a main body (now shown), an insulating side frame 11 surrounding the main body, and a conductive line 12 inside the insulating side frame 11. The conductive line 12 is used as an antenna. The conductive line 12 comprises a first segment 121 and at least two bended segments 122 connected to the first segment 121. Furthermore, the bended segments 122 extend from the first segment 121 and are protruded. One of the bended segments 122 is configured as a ground 1221 of the antenna and another of the bended segments 122 is configured as a feed point 1222 of the antenna.

In contrast to the conventional art, the mobile terminal comprises a main body, an insulating side frame surrounding the main body, and a conductive line that is placed in the insulating side frame, configured to work as an antenna. The conductive line comprises a first segment and at least two bended segments, wherein the two bended segments connected to and extend from the first segment and are protruded. One of the bended segments is configured as a ground and another of the bended segments is configured as a feed point of the antenna. Accordingly, the antenna is placed in the insulating side frame of the mobile terminal such that the antenna could be away from the inner metal components of the mobile terminal. In this way, the performance of the antenna could be improved.

The mobile terminal 10 comprises a main body (now shown), an insulating side frame 11 surrounding the main body, and a conductive line 12 inside the insulating side frame 11. The conductive line 12 is used as an antenna. The conductive line 12 comprises a first segment 121 and at least two bended segments 122 connected to the first segment 121. Furthermore, the bended segments 122 extend from the first segment 121 and are protruded. One of the bended segments 122 is configured as a ground 1221 of the antenna and another of the bended segments 122 is configured as a feed point of the antenna. The material of the conductive line 12 could be Copper, Iron, Aluminum, stainless steel, Magnesium alloy, Magnesium-Aluminum alloy, Zinc alloy or any other metal conductive material. The material of the insulating side frame 11 could be plastic, rubber or any other insulating material.

Specifically, the insulating side frame 11 could comprise an outer side surface 11A and an inner side surface 11B. Here, the outer side surface 11A is exposed to the external environment. The inner side surface is opposite to the side surface and/or the bottom surface of the main body of the mobile terminal 10. In an embodiment, the first segment 121 of the conductive line 12 could be completely covered by the insulating side frame 11. That is, the thickness of the insulating side frame 11 is not less than the diameter of the conductive line 12. For example, the thickness of the insulating side frame 11 could be between 1-1.5 mm and the diameter of the conductive line 12 could be 0.8-1 mm.

A part of the bended segments 122 of the conductive line 12 (as the antenna) is protruded from the conductive line 12 and become to be outside the insulating side frame 11. Specifically, the bended segments 122 of the conductive line 12 could extend from the first segment 121 toward the inner side surface 11B of the insulating side frame 11 until a part of the bended segments 122 protrudes from the inner side surface 11B of the insulating side frame 11. In the actual implementation, the insulating side frame 11 and the conductive line 12 could be formed together by injection molding. Furthermore, before the injection molding, the original conductive line could be bended and/or curved to form the conductive line 12. Here, the original conductive line could be a commonly-used cylinder wire. In this way, there is no need to do the welding or stamping process and thus the manufacturing process of the antenna of the mobile terminal could be simplified.

Please refer to FIG. 5. The first segment 121 of the conductive line 12 could comprise a first sub-segment 1211 and a second sub-segment 1212. The conductive line 12 could comprise at least two bended segments 122. The two bended segments 122 are connected in series. One end of the series-connected bended segments is connected to the first sub-segment 1211 and another end of the series-connected bended segments is connected to the second sub-segment 1212. In this embodiment, the length of the first segment 1211 and the length of the second segment 1212 could be different to achieve two frequency bands of the antenna of the mobile terminal 10. In this embodiment, the first sub-segment 1211 of the length L1 corresponds to the working frequency γ1, wherein the relationship complies with the formula $γ1=c/(4L1)$. Here, c is the speed of light. The second sub-segment 1212 of the length L2 corresponds to the working frequency γ2, wherein the relationship complies with the formula $γ2=c/(4L1)$. Here, c is the speed of light.

The first sub-segment of the first sub-segment 1211 of the conductive line 12 could be longer to achieve the low frequency band of the mobile terminal 10. The second sub-segment 1212 of the first segment of the conductive line 12 could be shorter to achieve the high frequency band of the mobile terminal. Furthermore, if the first sub-segment 1211 is too long to be completely placed in one side frame of the insulating side frame, the first sub-segment 1211 could be placed in two or more adjacent side frames of the insulating side frame 11. Furthermore, the first sub-segment 1211 is curved and/or bended at the intersection of the two or more adjacent side frames of the insulating side frame 11. In addition, the second sub-segment 1212 could also be placed in one side frame or two adjacent side frame of the insulating side frame 11. In addition, if the second sub-segment 1212 is placed in two adjacent side frame of the insulating side frame 11, the second sub-segment 1212 is also bended or curved at the intersection of the two adjacent side frames of the insulating side frame 11.

In some embodiments, the number of the conductive lines 12 could be at least two and the two conductive lines 12 could surround the main body of the mobile terminal 10 in an interval. Here, each of the conductive lines 12 could correspondingly achieve at least two frequency bands. Furthermore, different conductive lines 12 could achieve identical frequency bands, different bands, or partially different bands. In this way, the mobile terminal 10 could cover a broader frequency band.

In order to maintain the antenna performance when the user holds the mobile terminal, the conductive line 12 could be placed in the top side frame, upper parts of the left/right side frame, or the bottom side frame of the insulating side frame 11. In this way, because the user normally holds the lower parts of the left/right side frame of the mobile terminal, the user's hand does not easily block the conductive line 12 when the conductive line 12 is placed in the top side frame, upper parts of the left/right side frame, or the bottom side frame of the insulating side frame 11. Accordingly, the antenna performance of the mobile terminal when the user is holding the mobile terminal could be maintained. It should be noted that the top side frame, left side frame, right side frame, and bottom side frame represent the top side frame, left side frame, right side frame, and bottom side frame when the mobile terminal 10 is normally used by the user. Although the upper part and the lower part could be different when the mobile terminal 10 is upside down. Normally, the lower part means a location closer to the bottom of the mobile terminal 10 and the upper part means a location closer to the top of the mobile terminal 10. Here, the top and the bottom of the mobile terminal 10 are referred to the top and the bottom of the mobile terminal 10 when it is normally used.

In this embodiment, the insulating side frame 11 could comprise a side frame portion 111 fixed on the side of the main body of the mobile terminal and a back cover portion 112 fixed on the lower part of the main body of the mobile terminal. In another embodiment, the insulating side frame 11 could comprise only the side frame portion 111 fixed on the side of the main body of the mobile terminal without the back cover portion 112. This change also falls within the scope of the present invention.

The conductive line 12 could be embedded in the side frame portion 111 of the insulting side frame 11 of the mobile terminal 10. In another embodiment, the conductive line 12 could be embedded in the back cover portion 112 of the insulting side frame 11 of the mobile terminal 10. Or, the conductive line 12 could be embedded in the intersection area of the side frame portion 111 and the back cover portion 112 of the insulting side frame 11 of the mobile terminal 10. In addition, in order not to increase the thickness of the mobile terminal 10 because of including the conductive line 12 inside the back cover portion 112, in a preferred embodiment, the conductive line 12 is embedded in the side frame portion 111 of the insulating side frame 11 of the mobile terminal 10 to prevent from influencing the user experience.

The conductive line 12 could comprise two bended segments 122 (such as the two bended segments 1221 and 1222 shown in FIG. 5). Here, one of the bended segments 122 could be used as a ground 1221 of the antenna. One of the bended segments 122 could be used as a feed point 1222 of the antenna. Specifically, when the conductive line 12 comprises multiple bended segments 122, the multiple bended segment 122 can be divided into sets of adjacent two bended segments 122 and one set could be used as a ground 1221 of the antenna and another set could be used as the feed point 1222 of the antenna.

The main body of the mobile terminal 10 could comprise a circuit board and a connecting spring sheet on the circuit board. Here, the number of the connecting spring sheets could be at least two. One end of the connecting spring sheets is electrically contacting the circuit board and another end of the of the connecting spring sheets is electrically connected to the bended segment. Specifically, at least one of the connecting spring sheets is electrically contacting the bended segment, which works as the ground of the antenna.

At least one of the connecting spring sheets is electrically contacting the bended segment, which works as the feed point of the antenna.

Please refer to FIG. 5 again. The bended segments 122 of the conductive line 12 could comprise a first straight line segment 122A, a second straight line segment 122B and a third straight line segment 122C. The first straight line segment 122A, the second straight line segment 122B and the third straight line segment 122C are connected in series. Here, the first straight line segment 122A is parallel to the third straight line segment 122C, and the second straight line segment 122B is vertical to the third straight line segment. Accordingly, the second straight line segment 122B of the bended segments 122 could be used as a contact surface to accomplish the electrical contact between the bended segments 122 and the connecting string sheets. In addition, in another embodiment, the second straight line segment 122B could be replaced by a curved line segment or a V-shape line segment.

In order to ensure the electrical connection between the connecting string sheets and the bended segments 122 of the conductive line 12, the connecting string sheets and the bended segments 122 of the conductive line 12 could have a contact area. That is, the connecting string sheets are electrically connected to the bended segments 122 of the conductive line 12 through the contact area. In addition, the shape of the contact area matches the shape of the bended segments 122 to further improve the electrical connection between the connecting string sheets and the bended segments 122 of the conductive line 12. For example, when the contact area of the connecting string sheets electrically contacts the second straight line segment 122B of the bended segments, the contact area could be designed as being cylindrical since the surface of the second straight line segment 122B is a cylinder.

In addition, the main body of the mobile terminal 10 could comprise a front cover. The connecting string sheets are placed between the front cover and the circuit board. In addition, in the assembly process of the mobile terminal 10, one end of the connecting string sheets could be electrically connected to the circuit board through welding and then the circuit board, the front cover and the insulating side frame 11 could be fixed as a whole through screws or wedges. In this way, the end of the connecting string sheets could closely contact the bended segments 122 of the conductive line 12.

The circuit board could comprise an antenna feeder line. One end of the connecting string sheets could be electrically connected to the antenna feeder line on the circuit board. Another end of the connecting string sheets could be electrically contacting the bended segments 1222. In this way, the antenna feeder line could transfer the EM signal to the conductive line 12 through the connecting string sheets and thus transmit the signal out. Or, the antenna feeder line could receive signal from the conductive line 12 through the bended segments 1222.

In order to modulate the antenna performance of the conductive line, the circuit board could further comprise an antenna matching circuit. The antenna matching circuit is electrically connected to the bended segment 1222 (which is used as the feed point of the antenna) through the connecting string sheets. Specifically, the antenna feeder line and the antenna matching circuit could be electrically connected to each other. Furthermore, the connecting string sheets, which are electrically connected to the antenna feeder line, could be directly connected to the antenna matching line. That is, the connecting string sheets could be electrically connected to the antenna feeder line through the antenna matching circuit. In this way, the resistance matching of the conductive line 12 (the antenna) could be achieved while the conductive line 12 is powered such that the antenna performance of the mobile terminal could be ensured.

The antenna matching antenna may include a n-type impedance matching circuit and/or a double L-type impedance matching circuit. The antenna matching circuit may include at least one capacitor and at least one inductor. In implementation, the impedance matching to the antenna of the selected frequency band can be achieved by selecting a suitable capacitance value and inductance value.

If multiple frequency bands of the mobile terminal 10 need to be achieved (which means there are multiple conductive lines 12), multiple antenna matching circuits and multiple antenna feeder lines could be implemented on the circuit board. Here, the antenna matching circuit on the circuit board could be one-by-one corresponding to the conductive 12 and the antenna feeder line on the circuit board could be one-by-one corresponding to the conductive 12.

The mobile terminal 10 could comprise the back cover having a matching size and shape of the front cover. The circuit board is assembled between the front cover and the back cover. The circuit board and the front cover 11/back cover could be fixed by any known method. Specifically, they can be fixed by using screws or wedges.

The material of the back cover could be metal, such as Aluminum alloy or stainless steel. The metal back cover has a better appearance. In another embodiment, the back cover could also be implemented with plastic, glass or ceramics.

The mobile terminal 10 could further comprise a display panel (not shown), for displaying information. The display panel is placed on the front cover such that the front cover could support the display panel. Specifically, the display panel could be a Liquid Crystal Display (LCD) panel, which can be a Thin Film Transistor (TFT) LCD panel, an In-Plane Switching (IPS) LCD panel, or a Splice Liquid Crystal Display (SLCD) panel. In another embodiment, the display panel could be an Organic Light-Emitting Diode (OLED) panel, which can be an AMOLED (Active Matrix Organic Light Emitting Diode) panel, a Super Active Matrix Organic Light Emitting Diode (Super AMOLED) panel or a Super Active Matrix Organic Light Emitting Diode Plus (Super AMOLED Plus) panel.

In above embodiments, the mobile terminal 10 could be, but not limited to, a smart phone or a tablet.

In contrast to the conventional art, the mobile terminal comprises a main body, an insulating side frame surrounding the main body, and a conductive line that is placed in the insulating side frame, configured to work as an antenna. The conductive line comprises a first segment and at least two bended segments, wherein the two bended segments connected to and extend from the first segment and are protruded. One of the bended segments is configured as a ground and another of the bended segments is configured as a feed point of the antenna. Accordingly, the antenna is placed in the insulating side frame of the mobile terminal such that the antenna could be away from the inner metal components of the mobile terminal. In this way, the performance of the antenna could be improved.

Above are embodiments of the present invention, which does not limit the scope of the present invention. Any modifications, equivalent replacements or improvements within the spirit and principles of the embodiment described above should be covered by the protected scope of the invention.

What is claimed is:

1. A mobile terminal, comprising:
a main body;
an insulating side frame surrounding the main body; and
a conductive line, placed in the insulating side frame, configured to work as an antenna, the conductive line comprising:
a first segment; and
at least two bended segments, connected to and extend from the first segment and are protruded such that a part of the bended segments is outside the insulating side frame; wherein one of the bended segments is configured as a ground and another of the bended segments is configured as a feed point of the antenna;
wherein the first segment comprises a first sub-segment and a second sub-segment, wherein one end of the bended segments is connected to the first sub-segment and another end of the bended segments is connected to the second sub-segment, and the first sub-segment and the second sub-segment have different lengths,
wherein the bended segments comprise a first straight line segment, a second straight line segment and a third straight line segment, the first straight line segment is parallel to the third straight line segment, and the second straight line segment is vertical to the third straight line segment.

2. The mobile terminal of claim 1, wherein the main body comprises:
a circuit board;
at least two connecting spring sheets;
wherein one of the connecting spring sheets has an end connected to the circuit board and another end electrically connected to the bended segment configured as the ground; and one of the connecting spring sheets has an end connected to the circuit board and another end electrically connected to the bended segment configured as the feed point of the antenna.

3. The mobile terminal of claim 2, wherein the connecting spring sheet has a contact area with the bended segments, and a shape of the contact area matches a shape of the bended segments.

4. The mobile terminal of claim 3, wherein the shape of the contact area is cylinder.

5. The mobile terminal of claim 2, wherein the circuit board has an antenna matching circuit, electrically connected to the feed point of the antenna through the connecting spring sheet.

6. The mobile terminal of claim 1, wherein a number of the conductive lines is not less than 2, and the conductive lines surrounds the main body in an interval.

7. The mobile terminal of claim 1, wherein a thickness of the insulating side frame is between 1-1.5 mm and a diameter of the conductive line is between 0.8-1 mm.

8. The mobile terminal of claim 1, wherein a material of the conductive line is copper, iron, aluminum, or stainless steel.

9. The mobile terminal of claim 1, wherein the first sub-segment is placed in two side frames adjacent to the insulating side frame and is curved or bended at an intersection of the two side frames.

10. A mobile terminal, comprising:
a main body;
an insulating side frame surrounding the main body; and
a conductive line, placed in the insulating side frame, configured to work as an antenna, the conductive line comprising:
a first segment; and
at least two bended segments, connected to and extend from the first segment and are protruded, wherein one of the bended segments is configured as a ground and another of the bended segments is configured as a feed point of the antenna,
wherein the bended segments comprise a first straight line segment, a second straight line segment and a third straight line segment, the first straight line segment is parallel to the third straight line segment, and the second straight line segment is vertical to the third straight line segment.

11. The mobile terminal of claim 10, wherein a part of the bended segments is outside the insulating side frame.

12. The mobile terminal of claim 10, wherein the main body comprises:
a circuit board;
at least two connecting spring sheets;
wherein one of the connecting spring sheets has an end connected to the circuit board and another end electrically connected to the bended segment configured as the ground; and one of the connecting spring sheets has an end connected to the circuit board and another end electrically connected to the bended segment configured as the feed point of the antenna.

13. The mobile terminal of claim 12, wherein the connecting spring sheet has a contact area with the bended segments, and a shape of the contact area matches a shape of the bended segments.

14. The mobile terminal of claim 12, wherein the circuit board has an antenna matching circuit, electrically connected to the feed point of the antenna through the connecting spring sheet.

15. The mobile terminal of claim 10, wherein a number of the conductive lines is not less than 2, and the conductive lines surrounds the main body in an interval.

16. The mobile terminal of claim 10, wherein the first segment comprises a first sub-segment and a second sub-segment, wherein one end of the bended segments is connected to the first sub-segment and another end of the bended segments is connected to the second sub-segment, and the first sub-segment and the second sub-segment have different lengths.

17. The mobile terminal of claim 10, wherein a thickness of the insulating side frame is between 1-1.5 mm and a diameter of the conductive line is between 0.8-1 mm.

18. The mobile terminal of claim 10, wherein a material of the conductive line is copper, iron, aluminum, or stainless steel.

* * * * *